United States Patent [19]

Medvick

[11] Patent Number: 4,828,296
[45] Date of Patent: May 9, 1989

[54] BULKHEAD MOUNTING FOR FLUID FITTINGS

[75] Inventor: Richard J. Medvick, Shaker Heights, Ohio

[73] Assignee: Swagelok Quick-Connect Co., Hudson, Ohio

[21] Appl. No.: 12,255

[22] Filed: Feb. 9, 1987

[51] Int. Cl.⁴ ............................................. F16L 41/00
[52] U.S. Cl. .................................... 285/158; 285/161; 285/316
[58] Field of Search ................ 285/158, 161, 192, 316

[56] References Cited

U.S. PATENT DOCUMENTS

| | | | |
|---|---|---|---|
| 1,107,289 | 8/1914 | Glauber | 285/158 |
| 1,109,920 | 9/1914 | Glauber | 285/158 X |
| 3,897,089 | 7/1975 | Leichsenving et al. | 285/158 |
| 4,114,853 | 9/1978 | Medvick | 285/316 X |
| 4,378,028 | 3/1983 | Weber et al. | 137/614.05 |

FOREIGN PATENT DOCUMENTS 694186  9/1964  Canada .................................. 285/158

*Primary Examiner*—Thomas F. Callaghan
*Attorney, Agent, or Firm*—Fay, Sharpe, Beall, Fagan, Minnich & McKee

[57] ABSTRACT

An improved bulkhead mounting arrangement for a fluid coupling. The coupling body includes a centrally located externally threaded region having a predetermined axial length. First and second panel nut members are received on the threaded region for independent, selective axial movement thereon. One nut is received on either side of the bulkhead or panel so that axial adjustability of the mounting position is advantageously provided.

1 Claim, 2 Drawing Sheets

BULKHEAD MOUNTING FOR FLUID FITTINGS

BACKGROUND OF THE INVENTION

This invention pertains to the art of fluid fittings and, more particularly, to mounting arrangements for each fittings.

The invention is particularly applicable to a bulkhead type mounting for quick-connect couplings of the type described in commonly assigned U.S. Pat. Nos. 4,114,853 of Medvick and 4,378,028 to Weber, et al. Although the invention will be described with particular reference to use on the female body portion of such a coupling, it will be appreciated that the invention has broader applications and uses.

Fluid couplings of the type described in the above-identified patents, the disclosures of which are incorporated hereinto by reference, generally comprise separate male and female body portions that may be selectively connected and disconnected in fluid communicating relation with each other. In selected applications, one of the body portions is closely received in a panel aperture, and a panel nut is typically disposed on a threaded end of the body portion. The panel nut is removed when the body portion is first inserted into the aperture. The body portion is advanced into the aperture until a shoulder or enlarged diameter portion abuts one side of the panel. The panel nut is then run up on the threaded end of the body portion from the other side of the panel to securely mount the body portion relative thereto. Once the body portion is secured to the panel, a compression-type fitting or other suitable connecting structure is mounted to the body portion at the terminus of the threaded end portion. The opposed end of the body portion is disposed in a cantilevered relationship from the panel for selective engagement with a mating coupling body portion.

Although this conventional panel mounting arrangement has met with substantial commercial success, a few areas remain for improvement. Namely, the axial extension of the coupling body portion from the panel is fixed since the panel is disposed intermediate a fixed shoulder or enlarged diameter portion and the panel nut. Dimensional requirements in different environments may render alteration of this predetermined axial length advantageous. Even one-eighth or one-quarter of an inch can be crucial. As a result, it has been considered desirable to have the capability of adjusting the axial extension of the body portion from the panel.

It also has been considered desirable to shorten the amount of axial extension of the coupling body portion from the panel. Undue torque can otherwise be transferred to the panel and panel nut under the conventional arrangement. It has been considered desirable, therefore, to provide a central mounting area on the coupling body portion to achieve a shorter axial extension from the panel.

Still further, it is deemed desirable to effect a reduction in the overall axial length of the coupling body portion. In this manner, the closed dimensional requirements on either side of the panel may be alleviated somewhat to provide greater room for fitting installation, replacement, and the like.

The subject invention is deemed to overcome the above noted problems and others in an efficient and economical manner. The invention provides greater versatility and adjustability for a bulkhead mounting arrangement.

SUMMARY OF THE INVENTION

In accordance with the present invention, a new and improved bulkhead mounting for fluid couplings is advantageously provided.

More particularly in accordance with the invention, a coupling body portion adapted for mounting to an associated bulkhead or panel includes a body member having a central passage, a first end adapted for selective operative engagement with an associated mating coupling body portion, and a second end adapted for connection to an associated fluid line. A sleeve received on the body member is biased axially toward the body member first end. An adjustable panel mounting means includes a threaded region interposed between the first and second ends. First and second nut members are, in turn, cooperatively received by the threaded region for selective adjustment therealong to retainingly engage a bulkhead or panel therebetween.

According to another aspect of the invention, the body member includes a female receiving member at the first end and a body extension section at the second end.

According to yet another aspect of the invention, the threaded region is disposed on the female receiving member intermediate the first and second ends of the coupling body.

According to a further, alternative aspect of the invention, the threaded region is disposed on an annular member received over one end of the female receiving member.

A principal advantage of the invention resides in the capability for adjusting the mounting arrangement of the coupling body portion to the panel.

Another advantage of the invention is realized in the reduced torque imposed on a coupling body portion.

Still another advantage resides in the shortened overall axial length of the coupling body portion.

A still further advantage of the invention is found in the accessibility from either side of an associated bulkhead or panel.

Still other advantages and benefits will become apparent to those skilled in the art upon a reading and understanding of the following detailed description.

BRIEF DESCRIPTION OF THE DRAWINGS

The invention may taken physical form in certain parts and arrangements of parts, preferred embodiments of which will be described in detail in this specification and illustrated in the accompanying drawings which form a part thereof, and wherein.

DETAILED DESCRIPTION OF THE PREFERRED EMBODIMENTS

Figure 1:
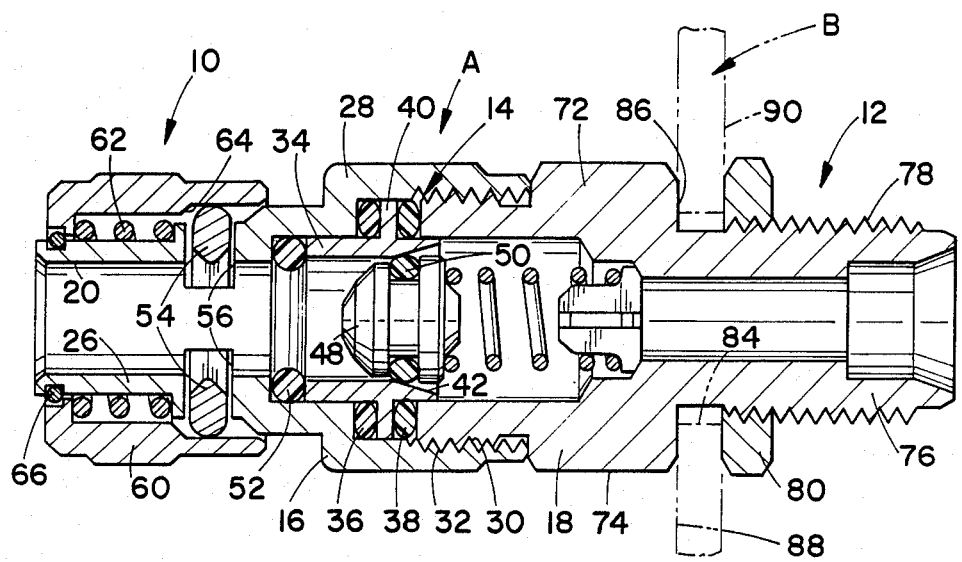
FIG. 1 is a vertical cross-sectional view of a conventional female coupling body portion mounted to a panel.

Referring now to the drawings wherein the showings are for purposes of illustrating the preferred embodiment of the invention only, and not for purposes of limiting same, the FIGURES show an improved arrangement that facilitates bulkhead mounting of quick-connect couplings. This improved mounting is applicable to various quick-connect coupling arrangements and is most closely associated with those shown in commonly assigned U.S. Pat. No. 4,114,853 issued Sept. 19, 1978 to Medvick and commonly assigned U.S. Pat. No. 4,378,028 issued Mar. 29, 1983 to Weber, et al. The disclosures of these two patents are incorporated hereinto by reference.

With reference to the prior art arrangement of FIG. 1, essentially representing U.S. Pat. No. 4,378,028, the female coupling body portion A includes a first end 10 adapted for selectively and matingly receiving a male coupling body portion (not shown) and a second end 12 adapted for connection to an associated fluid system (not shown). Both of these connections may be made by conventional known means which do not themselves form a part of the present invention. Typically, the female coupling body portion includes a main body 14 show here as being formed from separate body sections 16, 18 having a central passageway 20 defined therethrough. The body section 16 has a generally cylindrical conformation, having a narrowed receiving region 26 at the first end and an enlarged region 28 at its other end. Prior art constructions of the type shown in FIG. 1 have an interior threaded region 30 at the enlarged diameter region. The internal threads cooperate and matingly receive external threads 32 of the second body section 18.

A combination valve seat/sealing sleeve 34 is axially and radially retained between the body sections 16, 18. A pair of axially disposed seal rings such as O-rings 36, 38 are disposed on opposite sides of a radially extending flange 490 to prevent fluid leakage at the juncture of the body sections. Further, a tapered valve seat area 42 cooperates with a spring biased poppet check valve 48, particularly cooperating wih seal ring 50. An enlarged seal ring such as O-ring 52 extends radially inward at one end of the combination valve seat/sealing sleeve. The O-ring 52 is adapted for sealing engagement with an associated male stem portion selectively received through the receiving region 26 as is known in the art.

Locking means such as locking dogs 54 are received in slotted areas 56 of body section 16. The locking dogs are moved radially inward into locking engagement with an associated male stem portion through selective axial movement of a locking/releasing sleeve 60. The sleeve 60 is biased outwardly toward the first end 10 by spring 62. A tapered camming surface 64 selectively engages the locking dogs to cam the dogs radially inward. A stop ring 66 limits outward movement of the sleeve 60 relative to the body section.

The second body section 18, as described above, includes an externally threaded region 32 at one end. Further, an enlarged diameter portion 72 includes tool receiving surfaces or wrench flats 74 to assist in make-up of the female coupling body portion. A reduced diameter section 76 is defined at the second end 12 of the coupling body portion and it, too, is externally threaded at 78. In prior art structures, such as the one shown in FIG. 1, the external threads 78 have considerable overall axial length in order to accommodate a compression fitting nut (not shown) for connection to an associated fluid line, as well as a bulkhead or panel mounting nut 80. The panel nut is designed to retain the female coupling body portion in aperture 84 on a panel or bulkhead B. More particularly, the enlarged diameter portion 72 of the body portion defines a radial shoulder 86 at the interface area with reduced diameter section 76. This shoulder abuttingly engages one face 88 of the panel B. A panel second face 90 is abuttingly engaged by the panel nut 80 as it is advanced along the threaded region 78. The panel nut can be suitably tightened against the panel second face to securely mount the female coupling body portion to the panel.

Figure 2:
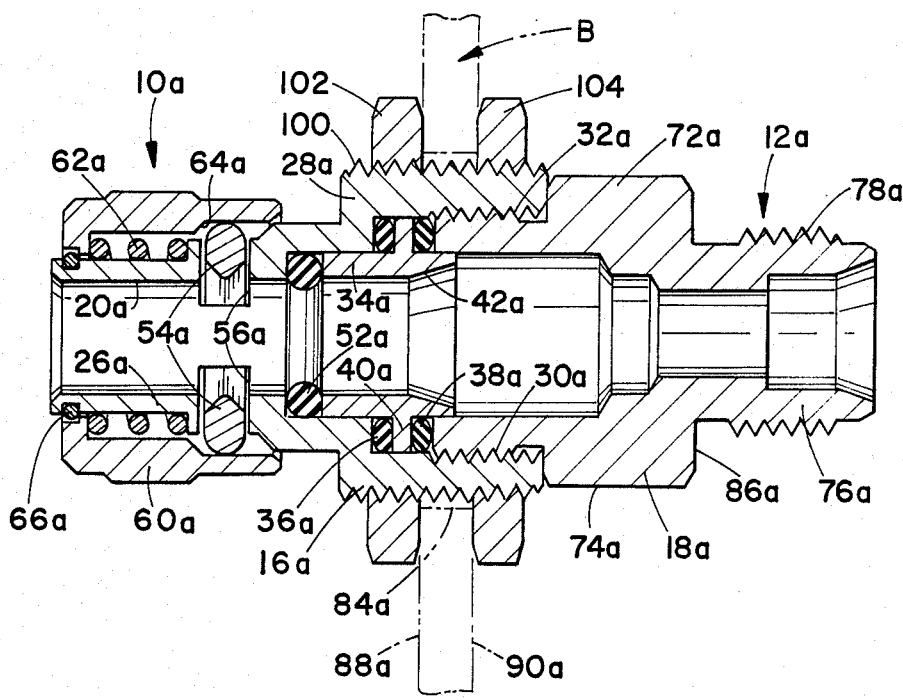
FIG. 2 is a vertical cross-sectional view of the subject invention having the new adjustable mounting means incorporated thereinto.

A comparison of the modified bulkhead mounting arrangement in FIG. 2 with the conventional mounting arrangement of FIG. 1 illustrates some of the problems overcome by the improved arrangement. For ease of illustration and discussion, like numerrals with the notation "a" refer to like elements, while new elements are identified by new numerals.

Figure 5:
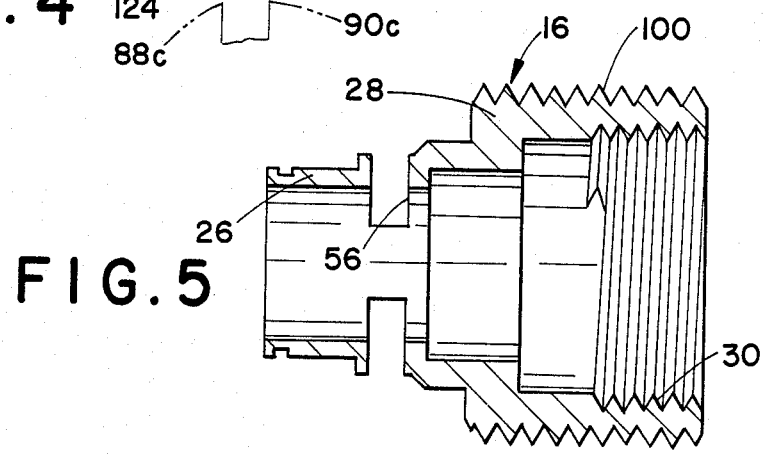

The enlarged diameter region 28a of the first body section includes an externally threaded region 100 (FIGS. 2, 5). Further, in accordance with the subject invention, first and second retaining members or panel nuts 102, 104 are threadedly received on region 100 for independent and selective axial movement. In this new arrangement, the overall axial dimension of the modified coupling body portion is substantially reduced. This reduction results from the limited amount of external threads 78a required at the second end of the coupling body portion. Since the panel, as well as the panel nut 80a, need not be accommodated adjacent the compression fitting nut, the axial length of the reduced diameter section 76a is substantially reduced. Although the spring biased poppet has been removed for ease of illustration, all other structural aspects of the modified body portion are the same as the prior art structures of FIG. 1 unless noted otherwise.

As is apparent from the foregoing, the enlarged diameter region 28a defines the maximum diameter of the entire female coupling body portion. Thus, the modified female body portion of FIG. 2 can be received through the aperture 86a from either side 88a or 90a of the panel. In the prior art arrangement of FIG. 1, the coupling body portion second end 12 can only be received through aperture 86 from the first side 88. Further, the opening in each panel nut 102, 104 in the new structure of FIG. 2 is larger than the remainder of the female coupling body portion. In this manner, the coupling nuts can be easily received over the coupling body portion from either end during the panel mounting process. This capability should be contrasted to the prior art arrangement of FIG. 1 where the coupling nut 80 could only be received over the second end 12 of the coupling body portion.

Still further, the generally centralized mounting of the coupling body portion along the enlarged diameter region reduces torque potentially imposed on the bulkhead or panel mounted fitting. With reference again to FIG. 1, it is apparent that with the coupling body portion mounted adjacent the second end 12, and with receipt of an associated male coupling body in the first end 10, a substantial torque arm is imposed should any forces having a component parallel to the panel be exerted on the first end 10. In the new FIG. 2 structure, securing the female coupling body portion along the central enlarged diameter region 28a substantially reduces the torque arm and, thus, the potential for fitting damage.

Yet another advantage realized by the modified arrangement of the subject invention is the capability for adjusting the axial position of the coupling body portion relative to the panel. The external threaded region 100 extends over a fairly large axial length and a panel can be received between the panel nuts 102, 104 virtually anywhere along this length. Thus, if it becomes necessary to position the receiving region 26a of the coupling body portion at a preselected dimension from the panel, rotation of the panel nuts permits some "play" to achieve a desired positioning. In prior arrangements, the panel had to be located at one position relative to the coupling body portion i.e., in abutting engagement with the enlarged diameter portion 72, and no axial adjustability was permitted.

Figure 3:
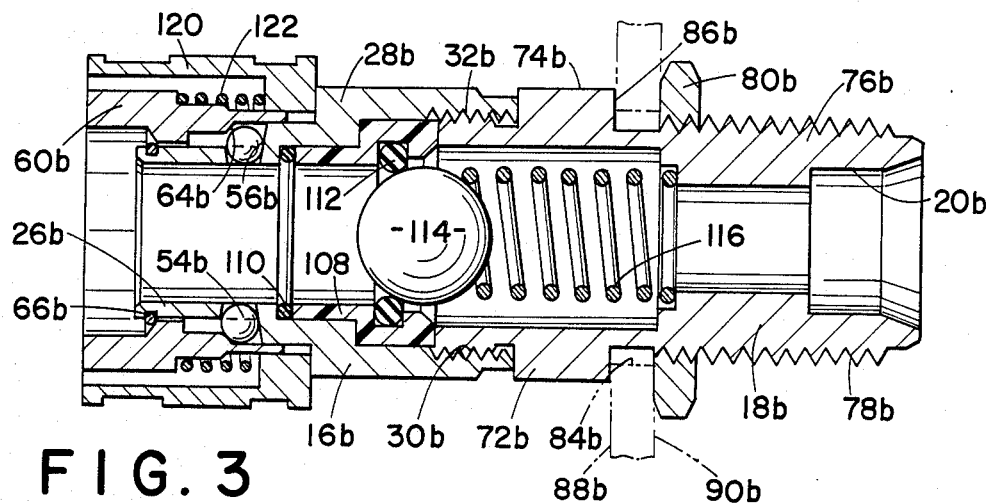
FIG. 3 is a vertical cross-sectional view of a conventional coded coupling body portion mounted to a panel.
Figure 4:
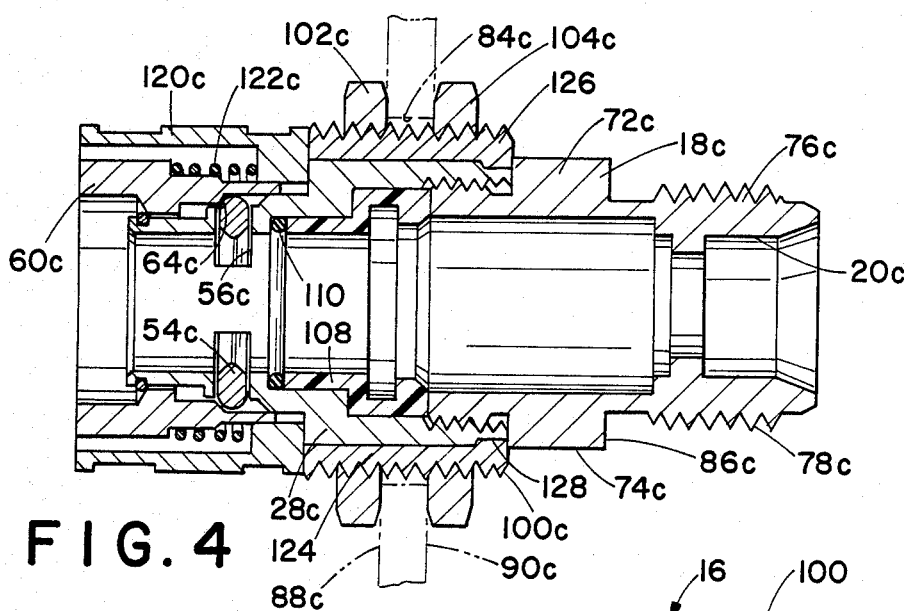
FIG. 4 is a vertical cross-sectional view of a coded coupling body portion having the new adjustable mounting means incorporated thereinto; and, FIG. 5 is a cross-sectional view of a body section formed in accordance with the subject invention.

Turning now to the coded coupling arrangement of FIGS. 3 and 4, and for ease of illustration, like elements are identified by like numerals with the notation b, c, respectively, and new elements are identified by new numerals. The prior art coded female coupling body portion of FIG. 3, representative of U.S. Pat. No. 4,114,853, also includes first and second body sections 16b, 18b interconnected along cooperating threaded portions 30b, 32b. The combination valve seat/sealing sleeve 108 is itself an elastomeric member that receives first and second O-rings 110, 112. The first O-ring 110 is comparable to the seal ring 52 of the FIG. 1 embodiment and is adapted for sealing engagement with an external portion of the male coupling body portion (not shown) as is known. The second O-ring 112 defines the valve seat for ball member 114 of the spring biased poppet assembly. The ball 114 and spring 116 can be removed (FIG. 4) if a shut-off arrangement is not required.

The coded coupling arrangement includes a somewhat modified locking/releasing sleeve 60b and a concentric coded sleeve 120. The sleeve 60b is spring biased toward engagement with stop ring 66b and includes a camming surface 64b to force the locking balls 54b radially inward. The coded sleeve 120 is also biased by spring 122 against the enlarged diameter region 28b. As is known in the art, various coded arrangements are selectively provided by altering the gap defined between the sleeves 60b and 120 or the axial length of the sleeves.

The conventional coded coupling arrangement also employs a single panel nut 80b that cooperates with shoulder 86b on the second body section. The panel is located between the nut and shoulder and the reduced diameter section 76b with external threads is extended for accommodating the panel nut as well as the compression fitting nut (not shown).

In a manner somewhat similar to the previously described FIG. 2 embodiment, the modified first body section of FIG. 4 is externally threaded at 100c along a major portion of its axial length to receive first and second panel nuts 102c, 104c. Preferably, the threaded region 100c is provided on a separate, cooperating annular member 124 received on the enlarged diameter portion 28c. The annular member includes a radially inward extending section 126 at one end cooperatively received in a peripheral groove 128 of the enlarged diameter portion 28c. The inward extending section is thereby axially returned between enlarged diameter portion 72c of the second body section and the remainder of the enlarged diameter section 28c of the first body section. The external threaded region 100c extends along the entire axial length of the annular member and, as shown, has a maximum radial dimension slightly less than the coded sleeve 120c. Additionally, the minor diameter of threaded portion 100c is slightly greater than the wrench flats 74c to accommodate the panel nuts over the second end 12c. Alternatively, the annular member has a maximum radial dimension greater than that of the coded sleeve to permit the panel nuts to be received over either end of the coupling body portion. It is necessary, though, in the illustrated arrangement of FIG. 4, that the panel nuts at least be easily received over the enlarged diameter portion 72c of the coupling body because of the enlarged coded sleeve 120c at the first end.

Once again, the overall axial length of the modified coded coupling arrangement of FIG. 4 is reduced in comparison to the conventional arrangement of FIG. 3. Further, the female coupling body portion is centrally mounted to the panel bulkhead to limit any imposed torques thereon. Still further, the mounting position of the female coupling body portion can be axially altered due to the enhanced length of the threaded region 100c and the use of two independently movable panel nuts 102c, 104c.

The invention has been described with reference to preferred embodiments. Obviously, modification and alterations will occur to others upon a reading and understanding of this specification. It is intended to include all such modifications and alterations insofar as they come within the scope of the appended claims or the equivalents thereof.

Having thus described the invention, it is now claimed:

1. In a quick-connect fluid fitting for mounting in an opening of an associated panel, the fitting including a body member having a through passage extending from a first end to a second end, said first end including a movable biased sleeve adapted for selective connection with an associated mated fitting, said sleeve normally disposed axially outward in a first non-engaged position, said second end adapted for connection to an associated fluid line, the improvement comprising:

an externally threaded region defined on said body member, said threaded region being disposed substantially midway between the first and second ends, of the body means for minimizing the amount of axial extension of said first and second ends from the associated panel, said threaded region being interposed between said sleeve and second end, and having an outer diametrical dimension greater than the remainder of said body member and less than the opening of the associated panel;

first and second internally threaded retaining members received over the first end of the body member into threaded communication with said threaded region for independent movement axially therealong to accommodate varying thicknesses of associated panels, said retaining members having an external dimension substantially greater than the opening in the associated panel to facilitate secure mounting of said fitting to the panel.

* * * * *